(12) United States Patent
Worrall

(10) Patent No.: US 10,711,736 B2
(45) Date of Patent: Jul. 14, 2020

(54) AIR CLEANER ASSEMBLY FOR AN INTERNAL COMBUSTION ENGINE

(71) Applicant: MANN+HUMMEL GmbH, Ludwigsburg (DE)

(72) Inventor: Jason Worrall, Portage, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 245 days.

(21) Appl. No.: 15/851,155

(22) Filed: Dec. 21, 2017

(65) Prior Publication Data

US 2019/0195172 A1    Jun. 27, 2019

(51) Int. Cl.
   *B01D 59/26*    (2006.01)
   *F02M 25/08*    (2006.01)
   (Continued)

(52) U.S. Cl.
   CPC ..... *F02M 25/0854* (2013.01); *B01D 46/0036* (2013.01); *B01D 46/0047* (2013.01); *B01D 53/0407* (2013.01); *B01D 53/0446* (2013.01); *F02M 35/0218* (2013.01); *F02M 35/10019* (2013.01); *F02M 35/10262* (2013.01); *F02M 35/10386* (2013.01); *B01D 2253/108* (2013.01); *B01D 2257/702* (2013.01); *B01D 2259/4516* (2013.01); *B01D 2259/4566* (2013.01); *F02M 25/089* (2013.01); *F02M 35/0215* (2013.01); *F02M 35/0216* (2013.01); *F02M 35/10144* (2013.01)

(58) Field of Classification Search
   CPC ......... F02M 25/0854; F02M 35/10019; F02M 35/0218; F02M 35/10262; F02M 35/10386; F02M 35/10144; F02M 35/0215; F02M 35/0216; F02M 25/089; B01D 53/0407; B01D 46/0047; B01D 53/0446; B01D 46/0036; B01D 2259/4566; B01D 2259/4516; B01D 2257/702; B01D 2253/108
   See application file for complete search history.

(56) References Cited

U.S. PATENT DOCUMENTS 6,692,551 B2    2/2004    Wernholm et al.
6,736,871 B1    5/2004    Green et al.
(Continued)

FOREIGN PATENT DOCUMENTS

CN    203090549 U    7/2013
EP    1843035 A2    10/2007
(Continued)

*Primary Examiner* — Dung H Bui
(74) *Attorney, Agent, or Firm* — James Hasselbeck

(57) ABSTRACT

An air cleaner assembly (100) for an internal combustion engine, has a housing (10) with at least one intake air inlet and at least one intake air outlet (14) formed in the housing wall (18) for supplying an intake air to the internal combustion engine, at least one filter element disposed within the housing (10) for filtering the intake air, separating a rough air side from a clean air side inside the housing (10), and at least one flow straightener insert (20) comprising a body structure (40) with a hydrocarbon absorbing medium (30) disposed at the clean air side of the filter element. The at least one outlet (14) accommodates the at least one flow straightener insert (20).

13 Claims, 5 Drawing Sheets

(51) Int. Cl.
*F02M 35/10* (2006.01)
*B01D 53/04* (2006.01)
*B01D 46/00* (2006.01)
*F02M 35/02* (2006.01)

(56) References Cited

U.S. PATENT DOCUMENTS

| | | |
|---|---|---|
| 7,182,802 B2 | 2/2007 | Bause et al. |
| 7,473,306 B2 | 1/2009 | Uemura et al. |
| 7,641,720 B2 * | 1/2010 | Li .................... F02M 35/024 55/378 |
| 8,191,535 B2 * | 6/2012 | Bellis ................ F02M 25/0854 123/516 |
| 8,191,539 B2 * | 6/2012 | Bellis ................ B01D 53/0415 123/198 E |
| 2002/0129711 A1 | 9/2002 | Oda et al. |
| 2003/0066427 A1 | 4/2003 | Ishida |
| 2003/0192512 A1 | 10/2003 | Luley et al. |
| 2004/0011197 A1 | 1/2004 | Wernholm et al. |
| 2004/0112219 A1 | 6/2004 | Leffel et al. |
| 2004/0255911 A1 * | 12/2004 | Abdolhosseini ... F02M 25/0854 123/518 |
| 2005/0126547 A1 | 6/2005 | Kato et al. |
| 2006/0150811 A1 * | 7/2006 | Callahan ............ B01D 53/0415 95/146 |
| 2006/0162704 A1 | 7/2006 | Hagler et al. |
| 2007/0022880 A1 | 2/2007 | Mizutani et al. |
| 2008/0093846 A1 * | 4/2008 | Sparks ................ F16L 37/0847 285/330 |
| 2008/0127949 A1 * | 6/2008 | Herald ................ F02M 35/024 123/519 |
| 2008/0168902 A1 | 7/2008 | Suzuki |
| 2008/0260991 A1 | 10/2008 | Konstandopoulos et al. |
| 2009/0261032 A1 | 10/2009 | Gohle et al. |
| 2009/0282793 A1 * | 11/2009 | Tomlin ............... F02M 25/0854 55/385.3 |
| 2009/0301071 A1 | 12/2009 | Dobert et al. |
| 2010/0089372 A1 | 4/2010 | Bellis et al. |
| 2015/0075500 A1 | 3/2015 | Moyer et al. |
| 2018/0171948 A1 * | 6/2018 | McClelland ......... F02M 35/024 |

FOREIGN PATENT DOCUMENTS

| | | |
|---|---|---|
| GB | 1225751 A | 3/1971 |
| JP | S6158676 U | 4/1986 |

\* cited by examiner

AIR CLEANER ASSEMBLY FOR AN INTERNAL COMBUSTION ENGINE

TECHNICAL FIELD

The invention relates to an air cleaner assembly for an internal combustion engine, in particular for an internal combustion engine of a vehicle.

BACKGROUND

U.S. Pat. No. 6,692,551 discloses an air cleaner assembly for an internal combustion engine and process for eliminating fuel emissions from passing into the atmosphere. The air cleaner assembly includes a housing including a filter element situated therein, an outlet for allowing filtered air to flow to the engine, and an inlet conduit extending from the housing for permitting the entry of air into the housing. A retainer is coupled to the inlet conduit. The retainer includes an adsorber member for reducing fuel emissions like hydrocarbons to an external atmosphere. The retainer comprises a wall defining a first open end and a second open end, wherein the wall has a cuffed portion about the second open end forming a recess facing the first open end. A portion of the inlet conduit is seated in the recess and the adsorber member is disposed within the first open end. The adsorber member comprises an outer perimeter sealingly abutting against the retainer wall.

SUMMARY OF THE INVENTION

It is an object of the invention to provide an air cleaner assembly for an internal combustion engine exhibiting improved performance in a limited packaging space.

The object is achieved according to the invention by an air cleaner assembly, comprising a housing with at least one intake air inlet and at least one intake air outlet formed in the housing wall for supplying an intake air to the internal combustion engine, at least one filter element disposed within the housing for filtering the intake air, separating a rough air side from a clean air side inside the housing, and at least one flow straightener insert comprising a body structure with a hydrocarbon absorbing medium disposed at the clean air side of the filter element, wherein the at least one outlet accommodates the at least one flow straightener insert.

The other claims, the description and the drawings describe advantageous embodiments of the invention.

An air cleaner assembly for an internal combustion engine is proposed, comprising a housing with at least one intake air inlet and at least one intake air outlet formed in the housing wall for supplying an intake air to the internal combustion engine, at least one filter element disposed within the housing for filtering the intake air, separating a rough air side from a clean air side inside the housing, and at least one flow straightener insert comprising a body structure with a hydrocarbon absorbing medium disposed at the clean air side of the filter element. The at least one outlet accommodates the at least one flow straightener insert.

Favorably, the inventive air cleaner assembly allows for integrating a hydrocarbon absorber (HCA) component on the clean side of the air cleaner. By providing the hydrocarbon absorber component at the clean air side of the filter element an increase of the pressure loss at the air intake inlet side of the air cleaner assembly can be avoided. Additionally, the inventive filter design minimizes packaging space within the air cleaner assembly.

The packaging space in vehicles is continuously decreasing, which can often create an air duct routing that is not ideal. The air duct routing through the vehicle can cause mass air flow sensor issues because of turbulences in the outgoing air flow, which may be corrected using a flow straightener component. The inventive air cleaner design may be integrated into any air cleaner assembly that requires a hydrocarbon absorber component and a flow straightener component with limited packaging space. The inventive design is advantageous for mass air flow sensor performance, reduced pressure loss of the intake air and packaging space.

According to an embodiment of the invention the hydrocarbon absorbing medium may cover the outer perimeter of a flow straightener insert and may be retained by, e.g., ultrasonic welding. For instance, a body providing the hydrocarbon absorbing medium may be wrapped around the outer perimeter of the flow straightener insert. After the hydrocarbon absorbing medium or the body providing the hydrocarbon absorbing medium, respectively, is welded to the flow straightener insert, the sub-assembly may be inserted into the mass air flow sensor tube which is an outlet of the housing of the air cleaner assembly. The sub-assembly is then fastened to the housing of the air cleaner assembly to meet a non-serviceable requirement. For instance, the sub-assembly may be fastened to the housing by ultrasonic welding.

Thus the inventive air cleaner assembly is superior to air cleaner assemblies known in the art, which comprise flow straightener components and HCA retainer components. The purpose of many HCA retainers known in the art is to retain the HCA media so the retainer can then be welded to the air cleaner assembly. In other designs the medium is welded directly to the air cleaner cover. According to the inventive embodiment, the hydrocarbon absorbing medium may be welded to a multi-functional component which is advantageous for mass air flow sensor performance. The inventive parts may be much smaller than components known in the art which will reduce manufacturing costs.

Advantageously, the inventive embodiment meets requirements in terms of location within the air duct system without increasing pressure loss of the intake air.

According to an advantageous embodiment the hydrocarbon absorbing medium may be arranged at least partially surrounding the body structure of the flow straightener insert on an outer surface, providing a gap in the hydrocarbon absorbing medium. The flow straightener insert may be formed cage-like with a body structure in an at least partially cylindrical shape. Thus the flow straightener insert may be easily accommodated in an outlet tube of the housing of the air cleaner assembly. The hydrocarbon absorbing medium may be wrapped about the perimeter of the body structure and fastened to the outer surface of the body structure. A gap between both ends of the hydrocarbon absorbing medium may be formed in order to accommodate the mass air flow sensor which may be inserted into the body structure of the flow straightener insert.

According to an advantageous embodiment the hydrocarbon absorbing medium may at least partially enclose an opening in the body structure for positioning of a mass air flow sensor in the opening. In order to increase the surface of the hydrocarbon absorbing medium for improving absorption of hydrocarbons contained in the air stream passing through flow straightener insert there may be only one opening in the hydrocarbon absorbing medium enclosing a corresponding opening in the body structure of the flow straightener insert for accommodating the mass air flow sensor. Thus the hydrocarbon absorbing medium may enclose the mass air flow sensor.

According to an advantageous embodiment the hydrocarbon absorbing medium may be fastened to the body structure of the flow straightener insert, in particular by one or more welding lines, in particular by ultrasonic welding. The hydrocarbon absorbing medium may be fixed to the body structure at edges of the hydrocarbon absorbing medium, which then forms a wrapping element, particularly on both ends of the wrapping element.

Advantageously the hydrocarbon absorbing medium may be fastened in the region enclosing the opening for the mass air flow sensor.

According to an advantageous embodiment the hydrocarbon absorbing medium may comprise a zeolite material which is commonly used as effective material for absorbing hydrocarbons, as, e.g., occurring in unwanted fuel emissions of vehicles.

According to an advantageous embodiment the body structure of the flow straightener insert may comprise at least one arcuate member and one or more V-shaped members, both having longitudinal axes in parallel, wherein the longitudinal axes of the at least one arcuate member and the V-shaped members may preferably be arranged in parallel to a longitudinal axis of an outlet tube of the housing of the air cleaner assembly. Such an arrangement of flow straightener elements prove to be advantageous for achieving a stable stratified air flow in the outlet tube of the air cleaner assembly. Stable conditions for receiving reproducible measuring results of the air flow with a mass air flow sensor may be achieved by this arrangement. The flow straightener elements like the arcuate member and surrounding V-shaped members may be arranged in a configuration parallel to the air flow direction through the tube of the outlet.

Advantageously, the body structure of the flow straightener insert as well as the V-shaped members and the at least one arcuate member may comprise a polyamide material, particularly a polyamide material reinforced with glass fibers as, e.g., PA6-GF30, a polyamide material containing 30% per volume of glass fibers. The housing of the air cleaner assembly may be favorably composed of the same material. Providing the same material for the housing as well as the flow straightener insert results in reducing or avoiding dimensional problems due to temperature and/or humidity effects in the ambient atmosphere. Alternatively, it may also be advantageous to use different material combinations for the housing and the flow straightener insert in other embodiments.

According to an advantageous embodiment the V-shaped members may be arranged in a star-shaped manner inside the flow straightener insert about the longitudinal axis of the body structure of the flow straightener insert. Such a star-shaped configuration proves to be particularly advantageous due to forming essentially symmetric and stable stratified air flow conditions in the flow straightener insert.

According to an advantageous embodiment the V-shaped members may comprise vanes being fixed to the body structure of the flow straightener insert, wherein the at least one arcuate member may be composed of an arcuate section extending between vane sections being fixed to the body structure. The flow straightener elements like V-shaped members and arcuate member may be fastened inside the body structure to the outer structure of the body structure. The outer structure of the body structure may be formed cage-like, thus self-stabilizing the body structure of the flow straightener insert.

According to an advantageous embodiment the arcuate member may comprise at least one arcuate section extending between vane sections being fixed to the body structure of the flow straightener insert. Thus the arcuate member may be shaped as kind of a M-shaped member but with the two vanes being connected by an arcuate section extending between inner ends of the vanes. By this way it is possible to provide enough space inside the body structure of the flow straightener insert for accommodating the mass air flow sensor.

According to an advantageous embodiment adjacent vanes and vane sections of the V-shaped members and the arcuate members, respectively, may be separated by a spacing in radial direction. This arrangement of vanes and vane sections may generate an advantageous behavior of the air streaming through the outlet tube of the air cleaner assembly in order to achieve stable and reproducible air flow characteristics and, hence, measuring conditions for the mass air flow sensor.

According to an advantageous embodiment an opening may be provided in the body structure of the flow straightener insert for positioning of a mass air flow sensor, extending inside the body structure of the flow straightener insert. The opening may be arranged congruently to an opening in a tube of the at least one outlet for positioning the mass flow sensor with the flow straightener insert being mounted inside the outlet. Thus the mass air flow sensor may be inserted into the body structure of the flow straightener insert and reach with its sensing element to a favorable position in the body structure for achieving stable and reproducible measuring conditions for the mass air flow sensor.

According to an advantageous embodiment the arcuate member may be arranged inside the body structure opposite to the opening for the mass air flow sensor. By this way favorable packaging conditions for the mass air flow sensor may be achieved. Favorably, enough open space can be arranged near the center of the body structure of the flow straightener insert in order to accommodate the mass air flow sensor.

According to an advantageous embodiment the flow straightener insert may be fastened, in particular welded, most favorably ultrasonically welded, to the at least one outlet, in particular into the outlet tube. By this way the flow straightener insert with the hydrocarbon absorbing medium and the mass air flow sensor may be fixed to the housing of the air cleaner assembly and may not be removed without damaging the housing. These fastening conditions may be advantageous under certain law restrictions against removing the hydrocarbon absorbing medium and/or the mass air flow sensor.

According to an advantageous embodiment the body structure of the flow straightener insert may be provided with an alignment locator for positioning the flow straightener insert inside the outlet. The alignment locator may serve in an advantageous way for mounting the flow straightener insert in a reproducible position to the outlet tube of the housing. By this way reproducible measuring conditions in the intake air flow for the mass air flow sensor may be achieved.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION OF THE DRAWINGS

Figure 1:
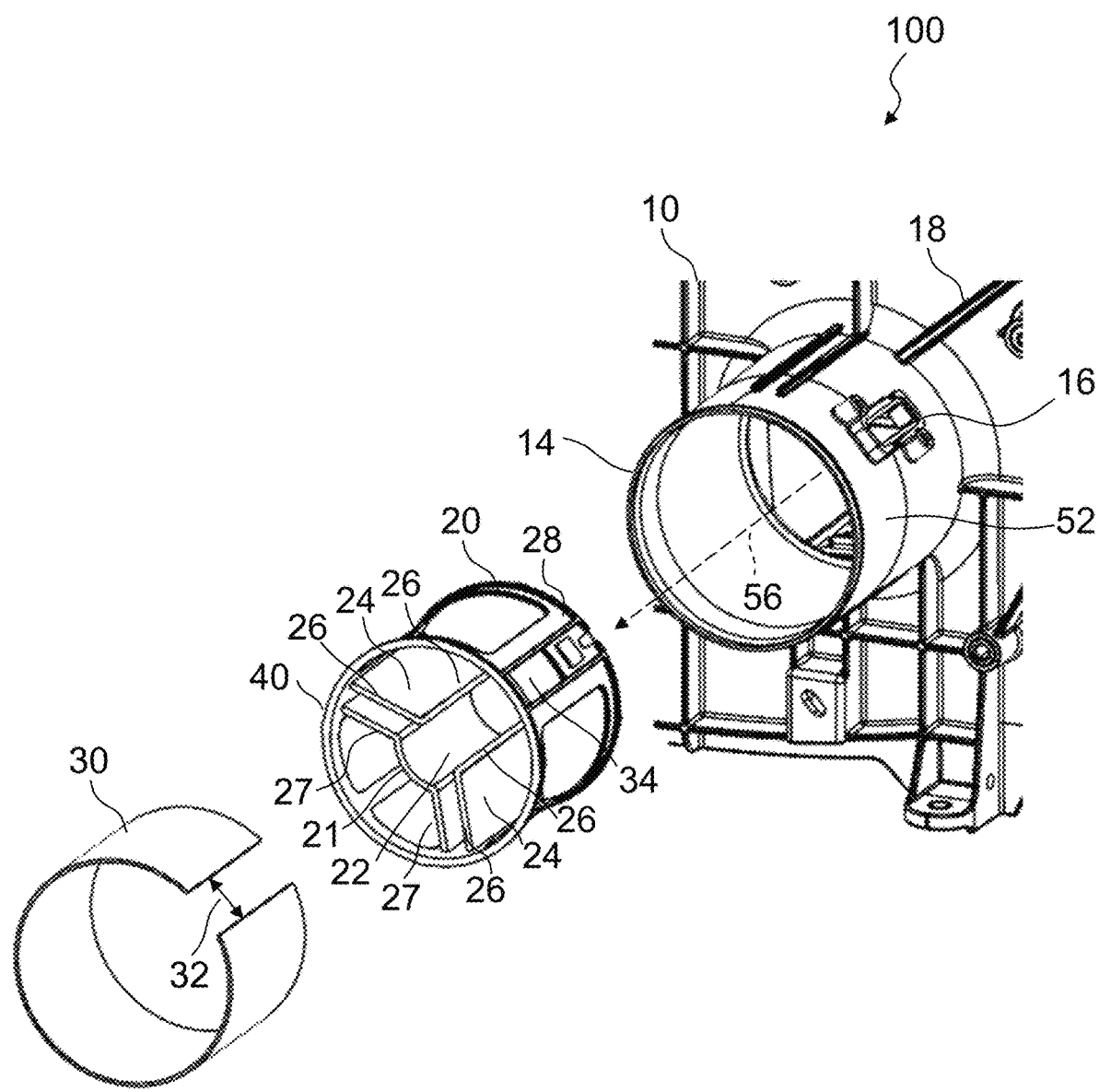
FIG. 1 an isometric exploded view of an air cleaner assembly according to an example embodiment of the invention, depicting an outlet tube of a housing with a flow straightener insert.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
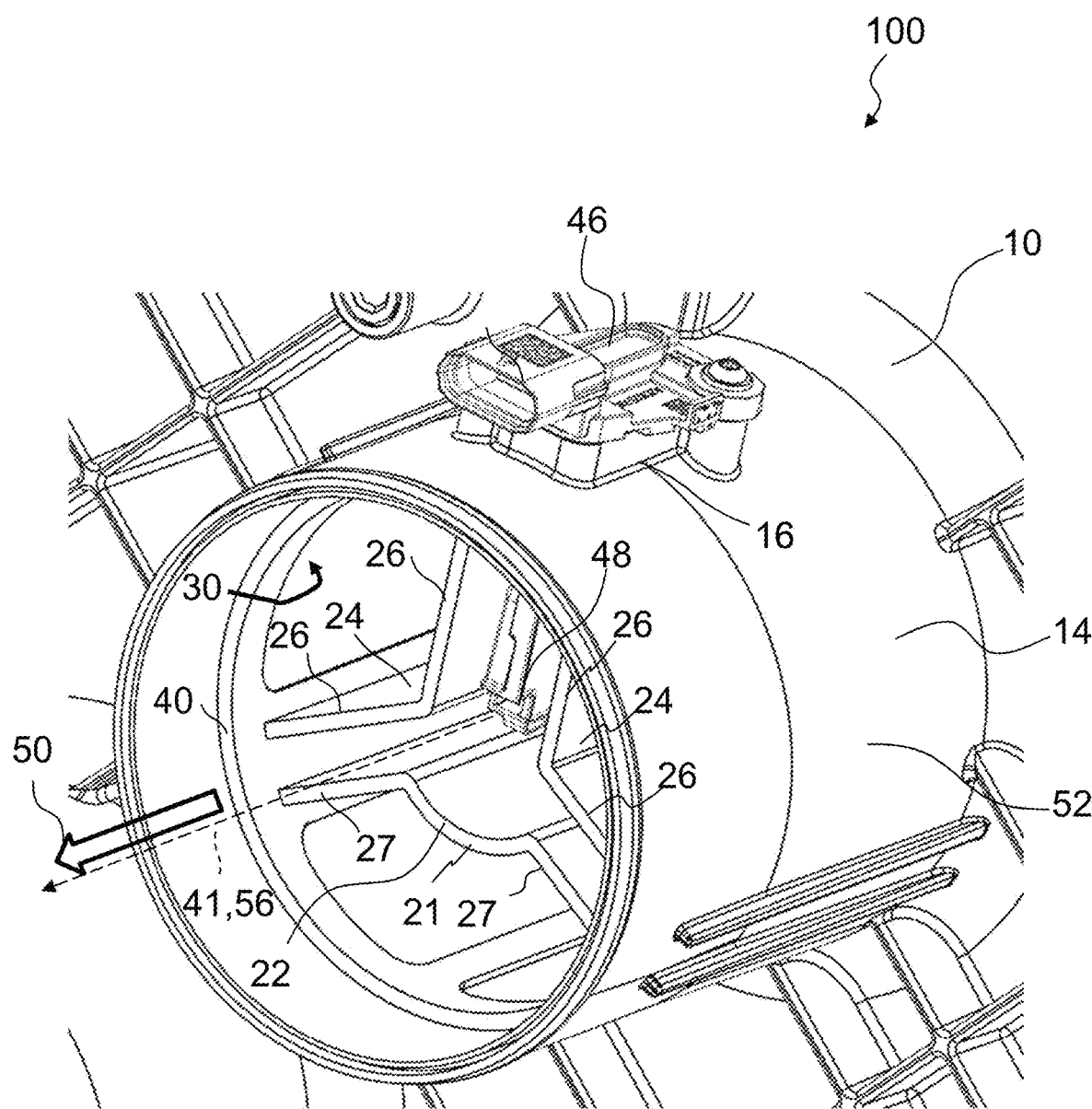
FIG. 2 an isometric view of the flow straightener insert of FIG. 1 mounted in the outlet tube.

FIG. 1 depicts an isometric exploded view of an air cleaner assembly 100 according to an example embodiment of the invention, depicting an outlet tube 52 of the housing 10 with a flow straightener insert 20, whereas in FIG. 2 an isometric view of the flow straightening hydrocarbon adsorption insert or flow straightener insert 20 of FIG. 1 mounted in the outlet tube 52 is shown.

The air cleaner assembly 100 for an internal combustion engine, as shown in the exploded view in FIG. 1, comprises a housing 10 with at least one intake air inlet (not shown in the Figure) and at least one intake air outlet 14 formed in the housing wall 18 for supplying an intake air to the internal combustion engine. The housing 10 is only shown as a part of the housing 10, focusing on the outlet 14.

The air cleaner assembly 100 comprises at least one filter element (not shown) disposed within the housing 10 for filtering the intake air, separating a rough air side from a clean air side inside the housing 10. The filter element is not depicted in the Figures. The air cleaner assembly 100 further comprises a flow straightener insert 20 disposed at the clean air side of the filter element, the flow straightener insert 20 comprising a body structure 40 with a hydrocarbon absorbing medium 30 arranged at the outer perimeter of the flow straightener insert 20. The outlet 14 of the air cleaner assembly 100 is provided for accommodating the flow straightener insert 20.

The hydrocarbon absorbing medium 30 is arranged at least partially surrounding the body structure 40 of the flow straightener insert 20 on an outer surface 28, providing a gap 32 in the hydrocarbon absorbing medium 30. The hydrocarbon absorbing medium 30 has a cylindrically shaped body as shown in FIG. 1.

The hydrocarbon absorbing medium 30 for absorbing hydrocarbons like fuel emissions may comprise or be composed of a zeolite material.

FIG. 2 exhibits the flow straightener insert 20 mounted in the outlet tube 52 of the outlet 14 of the housing 10 of the air cleaner assembly 100. The outlet tube 52 has a longitudinal axis 56. A mass air flow sensor 46 is extending through an opening 16 in the wall of the outlet tube 52 and the opening 34 of the body structure 40 of the flow straightener insert 20 into the body structure 40 and extends to the center of the body structure 40. The air flow through the flow straightener insert 20 is depicted as an arrow 50. For simplicity reasons, the general direction of the air flow 50 is considered predominantly in parallel to the longitudinal axis 56 of the outlet tube 52.

The flow straightener insert 20 is fastened, in particular welded, to the at least one outlet 14.

Figure 3:
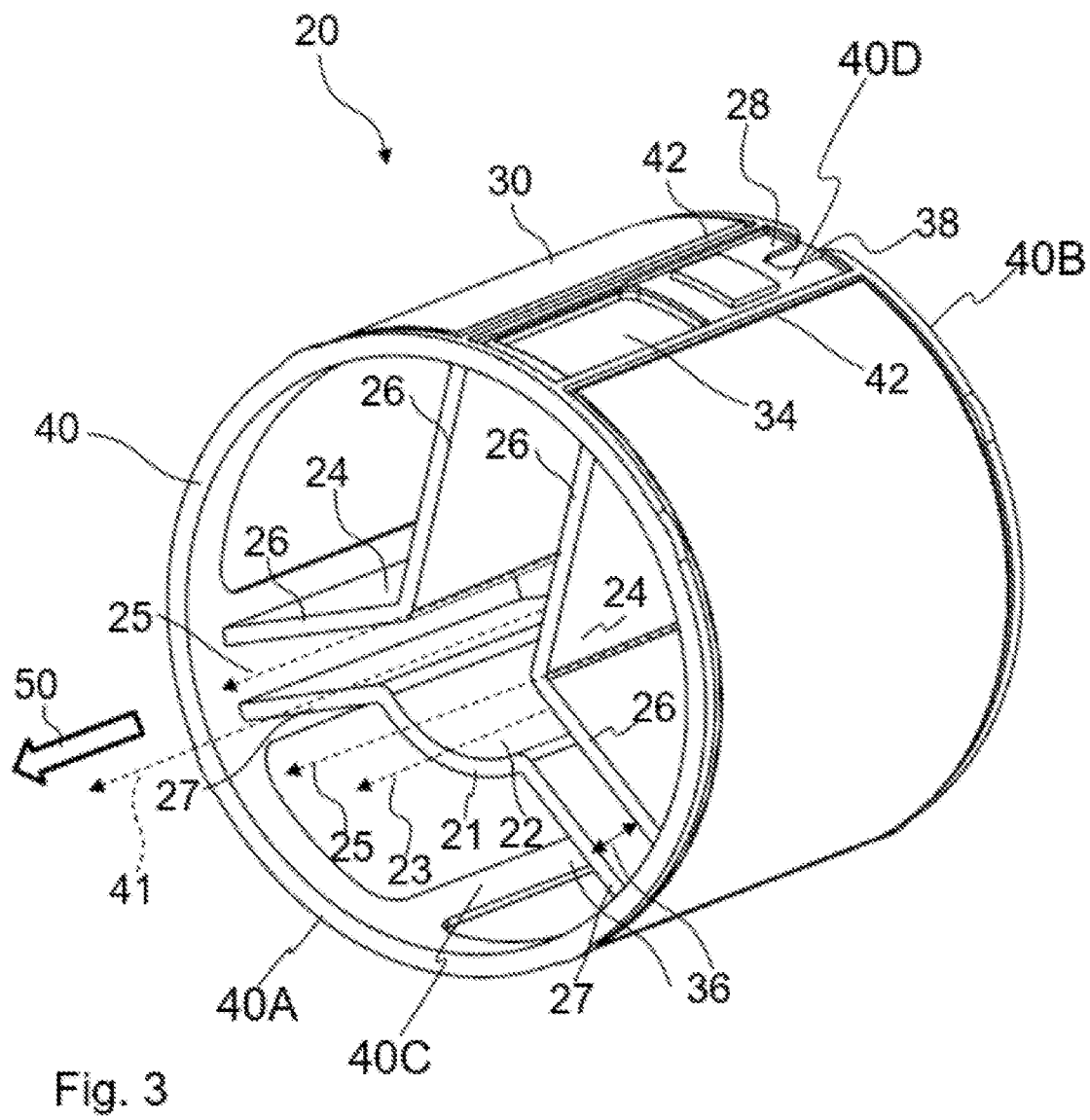
FIG. 3 an isometric view of the flow straightener insert of FIG. 1 covered with a hydrocarbon absorbing medium.
Figure 4:
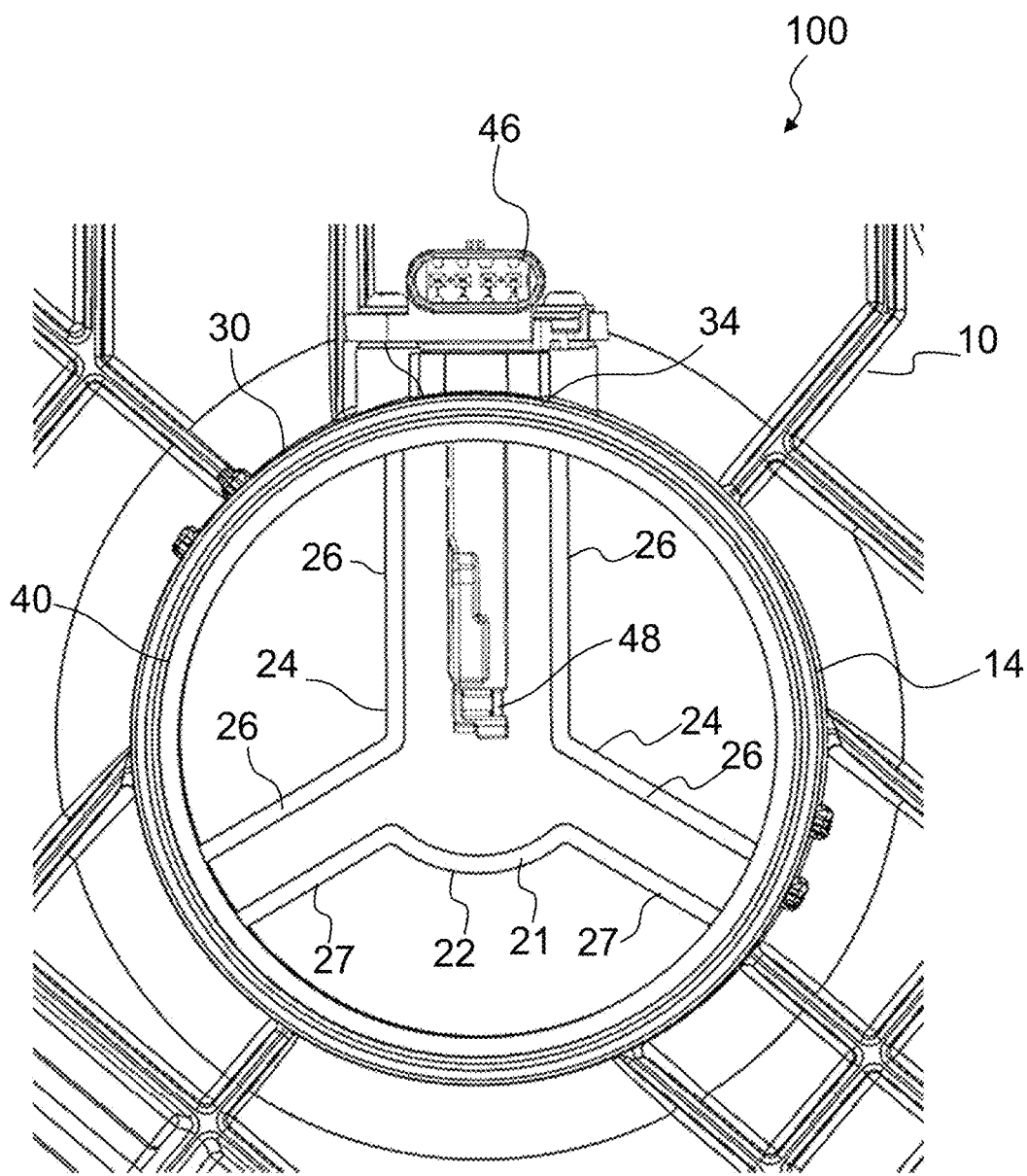
FIG. 4 a front view of the air cleaner assembly with the flow straightener insert mounted in the outlet tube.
Figure 5:
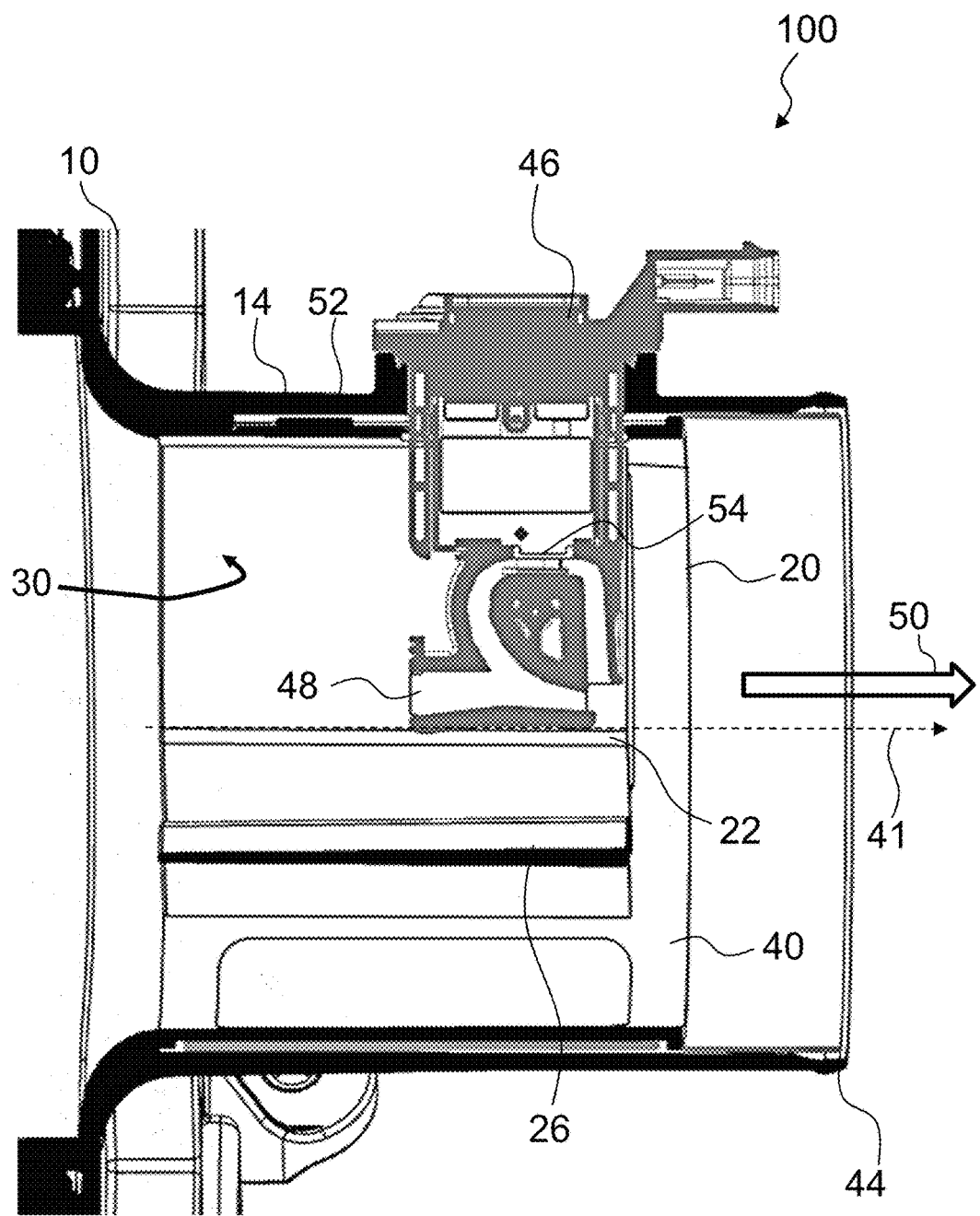
FIG. 5 a longitudinal sectional view of the outlet tube with the flow straightener insert and the mass flow sensor mounted.

FIG. 3 depicts an isometric view of the flow straightening hydrocarbon adsorption insert 20 or flow straightener insert 20 of FIG. 1, whereas in FIG. 4 a cross sectional view of the air cleaner assembly 20 through the outlet tube 52 with the flow straightener insert 20 mounted in the tube 52 and in FIG. 5 a longitudinal sectional view hereof is shown. The flow straightener insert 20 is depicted in FIG. 3 in more detail. The cage-like body structure 40 of the flow straightener insert 20 comprises a first circumferentially closed ring 40A at a first axial end of the cage-like body structure 40, a second circumferentially closed ring 40B at a second axial end of the cage-like body structure 40, at least one axially extending rib member 40C connected to the first circumferentially closed ring 40A and extending axially to connected to the second circumferentially closed ring 40B, one arcuate member 22 having a longitudinal axis 23 and two V-shaped members 24, having longitudinal axes 25, as illustrated in FIG. 3. The cage-like body structure 40 has a longitudinal axis 41. The longitudinal axes 23, 25 of the arcuate and V-shaped members 22, 24 are arranged in parallel to the longitudinal axis 56 of the outlet tube 52 which is in the mounted state generally in parallel to the air flow direction 50. The V-shaped members 24 are arranged in a star-shaped manner inside the flow straightener insert 20 about the longitudinal axis 41 of the cage-like body structure 40 of the flow straightener insert or flow straightening hydrocarbon adsorption insert 20. The cage-like body structure 40 has an axially elongated flow sensor receiving member 40D connected to the first circumferentially closed ring 40A and extending axially to connected to the second circumferentially closed ring 40B. The axially elongated flow sensor receiving member 40D has an radially outer surface 28 which forms a portion of a radial outer circumference of the flow straightening hydrocarbon adsorption insert 20. The axially elongated flow sensor receiving member 40D includes a flow sensor receiving opening 34 formed into and through the radially outer surface 28. The flow sensor receiving opening 34 is configured to receive a portion of a flow sensor (46) through the axially elongated flow sensor receiving member 40D into an interior of the cage-like body structure 40.

Each of the V-shaped members 24 comprises two vanes 26 connected to each other in the middle of the V-shaped member 24. The vanes are fixed to the body structure 40 of the flow straightener insert 20. At least one arcuate member 22 is provided which has predominantly an M-shaped body, having a arcuate section 21 extending between vane sections 27, the vane sections 27 being fixed to the body structure 40.

Adjacent vanes 26 and vane sections 27 of the V-shaped members 24 and the arcuate members 22, respectively, are separated by a spacing 36 in circumferential direction, as shown in FIG. 3.

An opening 34 is provided in the body structure 40 of the flow straightener insert 20 for positioning of a mass air flow sensor 46, extending inside the body structure 40 of the flow straightener insert 20. The opening 34 is arranged congruently to an opening 16 in a tube 52 of the at least one outlet 14. The opening 34 accommodates the mass flow sensor 46 with the flow straightener insert 20 being mounted inside the outlet 14.

The body structure 40 of the flow straightener insert 20 is provided with an alignment locator 38 for positioning the flow straightener insert 20 inside the outlet 14 in a reproducible manner.

The arcuate member 22 is arranged inside the body structure 40 opposite to the opening 34. In particular, the arcuate section 21 is located opposite to the opening 34, thus leaving free space for accommodating the mass air flow sensor 46.

The hydrocarbon absorbing medium 30 at least partially encloses the opening 34 in the body structure 40 for positioning of the mass air flow sensor 46 in the opening 34. The hydrocarbon absorbing medium 30 is fastened to the body structure 40 of the flow straightener insert 20, in particular by two welding lines 42 at both ends enclosing the opening 34 on two opposing sides of the hydrocarbon absorbing medium 30.

FIG. 4 depicts a front view of the air cleaner assembly 20 seen through the outlet tube 52 with the flow straightener insert 20 mounted in the tube 52. The star-shaped configuration of the V-shaped members 24 and the arcuate member 22 opposing the opening 34 for the mass air flow sensor 46 can be clearly seen in their mutual arrangement. The mass air flow sensor 46 extends in its mounted position with its sensing element near to the center of the body structure 40. The sensing element is accessible through an opening 48 inside the mass air flow sensor 46 The arcuate section 21 of the arcuate member 22 is facing the mass air flow sensor 46 and is concave-shaped providing a recess for the sensing element. Thus, the arcuate member 22 leaves enough free space for supporting favorable flow conditions for the air flow around the opening 48 of the mass air flow sensor 46.

In FIG. 5 a longitudinal sectional view through the outlet tube 52 of the air cleaner assembly 20 is shown. The flow straightener insert 20 is mounted in the outlet tube 52. The mass air flow sensor 46 is also shown in the sectional view with the opening 48 for the air flowing into the body of the mass air flow sensor 46. The air is guided to reach the sensing element 54 inside the body of the mass air flow sensor 46 and is as well guided to leave the body of the mass air flow sensor 46 on the rear side in flow direction 50 in a well-defined manner.

What is claimed is:

1. An air cleaner assembly for an internal combustion engine, comprising:
    a housing with at least one intake air inlet and an air outlet tube formed in a housing wall for supplying an intake air to the internal combustion engine,
    at least one filter element disposed within the housing for filtering the intake air, separating a rough air side from a clean air side inside the housing,
    a flow straightening hydrocarbon adsorption insert, comprising:
        a cage-like body which is tubular shaped and surrounding a longitudinal axis of the outlet tube and coinciding with a flow direction through the flow straightening hydrocarbon adsorption insert, the cage-like body comprising:
            a first circumferentially closed ring at a first axial end of the cage-like body;
            a second circumferentially closed ring at a second axial end of the cage-like body;
            at least one axially extending rib member connected to the first circumferentially closed ring and extending axially to connected to the second circumferentially closed ring;
            an axially elongated flow sensor receiving member connected to the first circumferentially closed ring and extending axially to connected to the second circumferentially closed ring, the axially elongated flow sensor receiving member having a radially outer surface which forms a portion of a radial outer circumference of the flow straightening hydrocarbon adsorption insert, the axially elongated flow sensor receiving member including:
                a flow sensor receiving opening formed into and through the radially outer surface of the axially elongated flow sensor receiving member, the flow sensor receiving opening configured to receive a portion of a flow sensor through the axially elongated flow sensor receiving member into an interior of the cage-like body;
            a hydrocarbon absorbing medium sheet extending circumferentially on an outer circumference of the cage-like body and supported on the at least one axially extending rib member, the hydrocarbon absorbing medium sheet having a first end edge and an oppositely arranged second end edge, the hydrocarbon absorbing medium sheet at least partially surrounding the outer circumference of the cage-like body;
            wherein the first end edge of the hydrocarbon absorbing medium sheet is fastened to a first edge of the axially elongated flow sensor receiving member;
            wherein the second end edge of the hydrocarbon absorbing medium sheet is fastened to an opposite second edge of the axially elongated flow sensor receiving member;
    wherein the flow straightening hydrocarbon adsorption insert is arranged within an interior of the air outlet tube of the housing.

2. The air cleaner assembly according to claim 1, wherein the first end edge and the second end edge sheet are circumferentially spaced apart forming a gap therebetween;
    wherein the axially elongated flow sensor receiving member is arranged in the gap between the first end edge and the second end edge of the sheet of hydrocarbon absorbing medium.

3. The air cleaner assembly according to claim 1, wherein the hydrocarbon absorbing medium is fastened along at least one welding line to the axially elongated flow sensor receiving member.

4. The air cleaner assembly according to claim 1, wherein the hydrocarbon absorbing medium sheet comprises a zeolite material.

5. The air cleaner assembly according to claim 1, wherein the cage-like body of the flow straightener insert comprises at least one arcuate member and one or more V-shaped members, both having longitudinal axes,
    wherein the longitudinal axes of the at least one arcuate member and the V-shaped members are arranged in the interior of the cage-like body and arranged parallel to the longitudinal axis of the air outlet tube.

6. The air cleaner assembly according to claim 5, wherein the V-shaped members are arranged in a star-shaped manner inside the cage-like body about the longitudinal axis.

7. The air cleaner assembly according to claim 5, wherein
the V-shaped members form vanes having an outer edge fixed to the circumferentially closed rings of the cage-like body,
wherein the at least one arcuate member is extending between vane sections being fixed to the body structure.

8. The air cleaner assembly according to claim 7, wherein
the at least one arcuate member comprises at least one arcuate section extending between and connected to vane sections being fixed to the cage-like body.

9. The air cleaner assembly according to claim 8, wherein
adjacent vanes and vane sections of the V-shaped members and the at least one arcuate member, respectively, are separated by a spacing in radial direction.

10. The air cleaner assembly according to claim 5, wherein
the flow sensor receiving opening of the cage-like body is arranged congruently to an opening in the air outlet tube of the housing for positioning the mass flow sensor within the flow straightening hydrocarbon adsorption insert.

11. The air cleaner assembly according to claim 5, wherein
the arcuate member is arranged inside the cage-like body opposite to the flow sensor receiving opening for the mass air flow sensor.

12. The air cleaner assembly according to claim 1, wherein
the flow insert is fastened to or welded to the air outlet tube.

13. The air cleaner assembly according to claim 1, wherein
the cage-like body is provided with an alignment locator formed in the axially elongated flow sensor receiving member for positioning the flow straightening hydrocarbon adsorption insert inside the air outlet tube.

* * * * *